(12) United States Patent
Rousseau

(10) Patent No.: US 7,593,842 B2
(45) Date of Patent: Sep. 22, 2009

(54) DEVICE AND METHOD FOR TRANSLATING LANGUAGE

(76) Inventor: Leslie Rousseau, 1100 S. Moline St., Aurora, CO (US) 80012

( * ) Notice: Subject to any disclaimer, the term of this patent is extended or adjusted under 35 U.S.C. 154(b) by 969 days.

(21) Appl. No.: 10/733,008

(22) Filed: Dec. 10, 2003

(65) Prior Publication Data

US 2004/0122678 A1    Jun. 24, 2004

Related U.S. Application Data

(60) Provisional application No. 60/432,106, filed on Dec. 10, 2002.

(51) Int. Cl.
*G06F 17/28* (2006.01)
*G06F 17/20* (2006.01)
*G10L 15/00* (2006.01)
*G10L 11/00* (2006.01)

(52) U.S. Cl. .................. 704/2; 704/4; 704/8; 704/236; 704/277

(58) Field of Classification Search .............. 704/4, 704/2
See application file for complete search history.

(56) References Cited

U.S. PATENT DOCUMENTS

| | | | |
|---|---|---|---|
| 426,583 A | 4/1890 | Davis | |
| 578,322 A | 3/1897 | Ferrell | |
| 4,641,264 A | 2/1987 | Nitta et al. | |
| 4,706,212 A | 11/1987 | Toma | |
| 4,769,846 A | 9/1988 | Simmons | |
| 4,980,829 A | 12/1990 | Okajima et al. | |
| 4,984,177 A | 1/1991 | Rondel et al. | |
| 5,175,793 A | 12/1992 | Sakamoto et al. | |
| 5,181,256 A | 1/1993 | Kamiya | |
| 5,384,701 A | 1/1995 | Stentiford et al. | |
| 5,463,713 A * | 10/1995 | Hasegawa | 704/260 |
| 5,634,086 A | 5/1997 | Rtischev et al. | |
| 5,696,980 A | 12/1997 | Brew | |
| 5,715,369 A | 2/1998 | Spoltman et al. | |
| 5,724,526 A | 3/1998 | Kunita | |
| 5,749,072 A | 5/1998 | Kazurkiewicz et al. | |
| 5,794,204 A * | 8/1998 | Miyazawa et al. | 704/275 |
| 5,796,916 A * | 8/1998 | Meredith | 704/258 |
| 5,802,467 A | 9/1998 | Salazar et al. | |
| 5,875,427 A * | 2/1999 | Yamazaki | 704/258 |
| 5,943,648 A * | 8/1999 | Tel | 704/270.1 |
| 6,006,185 A | 12/1999 | Immarco | |
| 6,108,627 A * | 8/2000 | Sabourin | 704/243 |
| 6,112,103 A | 8/2000 | Pathuff | |
| 6,161,083 A * | 12/2000 | Franz et al. | 704/4 |
| 6,173,250 B1 | 1/2001 | Jong | |
| 6,175,819 B1 | 1/2001 | Van Alstine | |
| 6,263,202 B1 | 7/2001 | Kato et al. | |
| 6,339,706 B1 | 1/2002 | Tillgren et al. | |

* cited by examiner

*Primary Examiner*—David R Hudspeth
*Assistant Examiner*—Justin W Rider

(57) ABSTRACT

A device and method for translating language is disclosed. In one embodiment, for example, a method for providing a translated output signal derived from a speech input signal, comprises receiving a speech input signal in a first language, converting the speech input signal into a digital format, comprising a voice model component representing a speech pattern of the speech input signal and a content component representing a content of the speech input signal, translating the content component from the first language into a second language to provide a translated content component; and generating an audible output signal comprising the translated content in an approximation of the speech pattern of the speech input signal.

10 Claims, 1 Drawing Sheet

DEVICE AND METHOD FOR TRANSLATING LANGUAGE

This application claims the benefit of U.S. provisional patent application No. 60/432,106 filed Dec. 10, 2002.

FIELD OF THE INVENTION

The present invention is related to device and method for translating language.

BACKGROUND OF THE INVENTION

God gave mankind the instrument of a voice to make recognizable audible sounds. These sounds evolved into a spoken language consisting of words and phrases. In the beginning language was all the same. Afterwards, language evolved into many different tongues spoken by many different people from different nations. Universal language translation is needed for the purpose of unifying all people of various cultures.

The invention described pertains to a device and method for providing real time speech translation between multiple parties. Translation systems have been developed previously, which include voice recognition systems to receive voice inputs that may be digitized and transmitted to a receiver and further routed to a receiving party. The audible outputs are achieved through automated voice models, or text displays and do not provide what would be considered simultaneous translations between different conversationalists using the original speaker's voice patterns.

Simultaneous translation has been described previously for a plurality of languages with prior art, for example, with the use of an electronic, voice interpreting machine—U.S. Pat. No. 5,724,526—which is capable of receiving input of a source language, a voice recognition means to recognize voice information and electronic translation means to translate the language of the original speaker, voice synthesis means transforming the translated language into vocal information and vocal output means to output the vocal information, in order to translate one language into another language sentence by sentence. These developments are not as simultaneous as desired and often times require the vocal inputs of the speakers to be very precise in order to prevent errors in the resulting translation.

Although speech recognition systems have greatly improved with the continued development of primary communication devices such as mobile telephones, language systems with the ability to provide translations of different spoken words in real time which do not interfere with smooth conversations between individuals by minimizing delays between the spoken words of the speaker and output of the translated language to the recipients, are much needed. It has also become more important for the systems of discussion to function quickly with minimal inconvenience to the users of these devices.

Sound distortions that are generated with voice recognition systems employing current technologies can also be responsible for errors in translations and minimization of these distortions is needed to provide simultaneous conversations with minimal disruption in the language exchange between individual users. Both of these features are key development areas for the next generation of real-time translation devices.

SUMMARY OF THE INVENTION

The present invention comprises a device and method to improve conversation between multiple parties with little inconvenience to the users. The present invention describes a device and method for translating the spoken language that is received by one party in real time into a different language or languages and routing this translation to the parties spoken to as an audible output of an actual voice. With the present invention, real-time speech is converted into digitized signals and routed through a digitized dictionary or other means for translating the signal. The translated signal is further transmitted to a routing station where the language outputs to the recipient(s) are provided as the represented voice pattern of the speaker with minimal delays and sound distortions.

The present invention was developed to solve the problems described above, such as delays in language exchange between conversationalists as well as to improve the speed of the translation process and the accuracy of the translation outputs. An objective of the invention is to provide a translation device, which makes it possible to maintain smoother conversation and more simultaneous translations between individuals of different language speaking nations in real time by providing speedier translations of spoken words with a higher degree of accuracy.

Another objective of the present invention is the ability to provide the translated word(s) of the original speaker to the recipients using the original speaker's voice patterns. This feature of the present invention is believed to be novel and has not been described previously in prior art for translation devices. This feature greatly improves the continuity of conversation by minimizing the perception of a third speaker and the time and effort required for recipients to become familiar with the sound of an additional voice during a conversational exchange. Additionally, this feature seeks to maintain the personal element between speakers that is lost when an unfamiliar voice is used to convey language translations and the message between speakers. Although this feature is an element that improves conversation between parties, it has been lacking in similar devices used to translate language. More recently, there is desire and increasing demand for outputs used in mass communication systems involving computers to sound less like a computer, driving the use of voice synthesis technologies that are more personable and human-like.

In the preferred embodiment, the device receives a voice pattern signal from the original speaker and the signal is recognized in the host language module of the translation device and is translated into corresponding multiple languages and phrases. The translation is transmitted to a routing station within the device, which is capable of channeling the translated response into more than one language as needed. Real-time translation with this device is achieved with a search of the host language module(s), transmission of the translated language to the routing device and identification of the speaker's digitized voice pattern from other language modules. The routing station of the translation device is capable of channeling the translated word(s) of the host language to the recipient's native languages simultaneously. The routing station is designed to channel a variety of different languages inputs to the corresponding language output of the recipient(s) using the voice pattern of the original speaker.

In a similar embodiment, real-time translation with this device is achieved with a search of the host language module(s), transmission of the translated language to the routing device and identification of the speaker's digitized voice pattern from other language modules. The routing station of the translation device is capable of channeling the translated word(s) of the host language to the recipient's native languages that have been pre-selected by the recipient. The routing station is designed to channel language inputs to the corresponding preselected language outputs of the recipient(s) using the voice pattern of the original speaker.

In one embodiment, minimal delays and sound distortions are possible with the present invention due to signal encoding which occurs with the use of voice pattern point clouds or matrices, that imprint the defining sounds (tones, inflections) of the speaker's voice inputs using vectors, density profiles, sound spectra, numerical analysis, FEA (finite element analysis) or FDS (finite difference schemes) or other means to create dimensional computer representations which can be used as a voice model. The voice model, or dimensional computer representation of the speaker's voice may be further reduced to a single point or points comprising the point clouds of respective speakers in the native language. The abbreviated digitized signal is transmitted to a routing station where it is located according to corresponding points on point clouds of respective speakers in the native language. The abbreviated digitized signal is then encoded as a full sentence and transmitted as the represented voice of the speaker.

In another embodiment, minimal delays and sound distortions are possible with the present invention since root words of the speaker's message are converted into digitized signals and routed through a dictionary which also uses abbreviated (root word) terms of the multiple languages of the recipient(s). The translated signal is further transmitted to a routing station where it is encoded into the language(s) of the recipient(s) in combination with the use of point clouds and small sections (finite elements) of the dimensional representations mentioned above and is channeled as outputs using the voice pattern of the original speaker.

Preferred languages of the multiple language dictionaries that are used in the translation processes described above include the languages of major countries in the world such as participating countries in the United Nations and parties to the Geneva Convention. Examples of major languages include but are not limited to: English, Spanish, German, French, Japanese Russian and Dutch.

The translation device that is described was designed to integrate several interchangeable modules with multiple functions to include: currency, weight and measurement conversions, bi-directional speakers, auxiliary amplifiers and plug-ins for PC's, cell phones, digital cameras, PDA's and other communication devices such as TV's, DVD's, etc., and docking stations and adapters for these electronic devices.

BRIEF DESCRIPTION OF THE DRAWING

The preferred embodiment of this invention is described in detail with reference to the following figures and numerals wherein.

DETAILED DESCRIPTION

Figure 1:
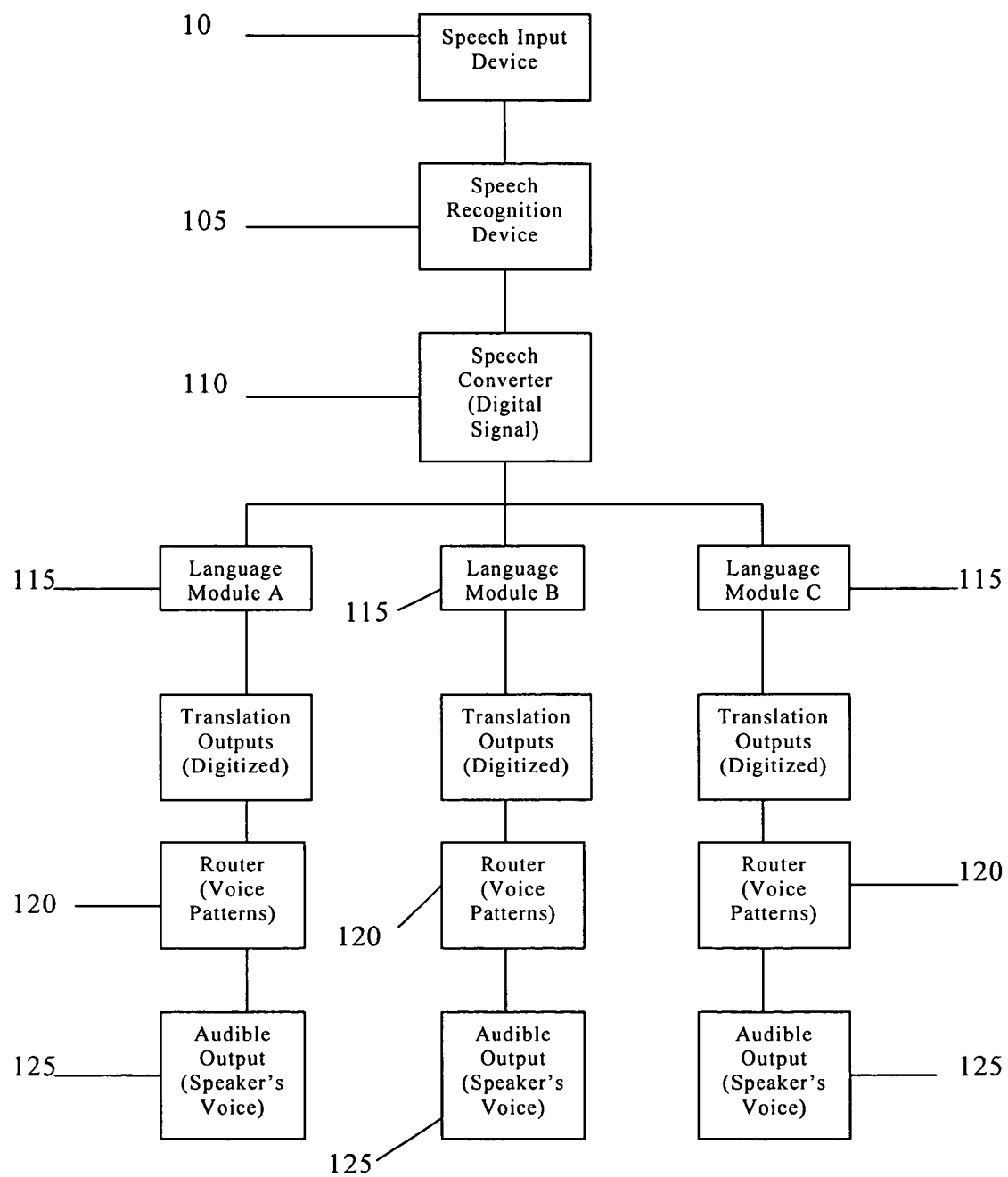
FIG. 1 is a block diagram of a speech-to-speech translation system further comprising: a speech input device 100, a speech recognition unit 105, a digitized speech converter 110, one or more language modules 115, one or more routers 120 and one or more speech output units 125.

The preferred embodiment, FIG.1, shows a block diagram of the present invention with the following components: a speech input device 100, a speech recognition unit 105, a digitized speech converter 110, multiple language modules 115, multiple routers 120, and multiple speech output units 125.

The translation device receives input from the original speaker via the speech input device 100, and the spoken word(s) are transmitted from the input device to the speech recognition unit 105, that uses speech recognition software to encode the signal input (spoken words). The encoded signal is further transmitted to the speech converter 110, to produce a digitized signal. The digitized signal is now in the best format to be read by the subsequent components in a faster and much more efficient manner. A digitized signal of the spoken word(s) is sent to multiple language modules 115, contained within the device to generate the same number of corresponding language outputs. The language modules are each capable of receiving and processing the same digitized signal and translating this digitized signal into the different language outputs or native tongues of each of the countries represented. The language modules generate digitized translations in languages of the recipients rather than translated words, phrases or full sentences which serves to further accelerate the time required for the entire translation process. Following the translation step with the language modules, the compressed signal(s) are sent to the routers where the speaker's voice patterns (computer sub-models) are evaluated for the best representation of the speaker's voice in each of the native tongues.

It is possible with the use of a voice model, or dimensional computer representation for the speaker's voice to be further abbreviated to a single point or points comprising the point clouds of respective speakers in the native language. The abbreviated digitized signal is transmitted to a routing station where it is located according to corresponding points on point clouds of respective speakers in the native language. The abbreviated digitized signal is then encoded as a full sentence and transmitted as the represented voice of the speaker.

Real-time translation with this device is achieved with a search of the host language module(s), transmission of the translated language to the routing device and identification of the speaker's digitized voice pattern from the language modules. The routing station is designed to channel a variety of different languages inputs to the corresponding language output of the recipient(s) using the voice pattern of the original speaker.

Although this invention has been described through the use of specific embodiments, many alternatives and modifications that are apparent to those skilled in the art could be made to the present system. Therefore, the preferred embodiment of the present invention is not intended to be limiting, but rather illustrative. It is further expected that the intent, the spirit and scope of the present invention to remain intact regardless of various changes.

I claim:

1. A method for providing a translated output signal derived from a speech input signal to improve conversation, the method comprising:
   i. receiving a speech input signal from a speaker in a first language via a speech input device;
   ii. converting the speech input signal into a digital format comprising a voice model component representing the speaker's voice patterns and a content component representing the content of the speech input signal;
   iii. translating the content component from the first language into a second language to provide a translated content component;
   iv. combining the translated content component with the voice model component to more accurately reflect conversational speech; and generating an audible output signal comprising the translated content in a second language in an approximation of the speaker's voice;
   v. wherein the audible output signal is an approximation of the speech patterns of the input signal, and the translated output is combined with the voice model component to approximate the speaker's voice to more accurately reflect conversational speech.

2. The method of claim 1, wherein the first language is identified from the content component.

3. The method of claim 1, wherein the first language is predetermined.

4. The method of claim 1, wherein the voice model component comprises a point cloud.

5. The method of claim 4, wherein the point cloud comprises an abbreviated version of the speech input signal.

6. The method of claim 1, wherein the content component comprises at least one word.

7. The method of claim 1, wherein the operation of translating the content component utilizes the voice model component.

8. The method of claim 1, wherein the voice model component utilized in the operation of translating the content component comprises a dialect.

9. The method of claim 1, wherein the audible output signal is generated simultaneously with the receipt of the speech input signal to allow for substantially real-time communication.

10. A device that provides for translation of speech, and improved conversation, the device comprising:

i. a speech input device component;

ii. a converter for converting a speech input signal received by the speech input device into a digital format comprising a voice model component representing the speaker's voice patterns, that is, the speech pattern of the speech input signal and a content component representing a content of the speech input signal;

iii. a language converter for translating the content component from a first language to a second language to provide a translated content component;

iv. a component for combining the translated content component with the voice model component; and v. a speech output device component for generating an audible output signal comprising the translated content component combined with the voice model component in an approximation of the speech patterns of the speech input signal to more accurately reflect conversational speech.

\* \* \* \* \*